United States Patent
Yeager et al.

(10) Patent No.: US 6,576,718 B1
(45) Date of Patent: Jun. 10, 2003

(54) POWDER COATING OF THERMOSETTING RESIN(S) AND POLY(PHENYLENE ETHERS (S))

(75) Inventors: Gary William Yeager, Schenectady, NY (US); Michael Teruki Takemori, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 94 days.

(21) Appl. No.: 09/617,969

(22) Filed: Oct. 4, 2000

Related U.S. Application Data

(60) Provisional application No. 60/157,683, filed on Oct. 5, 1999.

(51) Int. Cl.[7] .......................... C08L 33/02; C08L 33/14; C08L 63/02; C08L 67/02; C08L 71/12
(52) U.S. Cl. .......................... 525/523; 428/413; 525/132; 525/151; 525/437; 525/440; 525/481; 525/504; 525/508; 525/524; 525/534; 525/934
(58) Field of Search ............................. 525/523, 534, 525/132, 151, 437, 440, 481, 504, 508, 524, 934; 428/413

(56) References Cited

U.S. PATENT DOCUMENTS

| | | | |
|---|---|---|---|
| 3,455,736 A | 7/1969 | Davis et al. ................. | 117/218 |
| 4,147,737 A | 4/1979 | Sein et al. .................... | 427/27 |
| 4,286,021 A | 8/1981 | Brendley, Jr. et al. ....... | 428/413 |
| 4,623,558 A | 11/1986 | Lin .............................. | 427/44 |
| 4,853,423 A | 8/1989 | Walles et al. ................ | 523/428 |
| 4,912,172 A | 3/1990 | Hallgren et al. ............ | 525/396 |
| 4,920,164 A | 4/1990 | Sasaki et al. ................ | 523/466 |
| 4,975,319 A | 12/1990 | Walles et al. ................ | 523/429 |
| 5,001,010 A | 3/1991 | Chao et al. .................. | 525/396 |
| 5,043,367 A | 8/1991 | Hallgren et al. ............ | 523/429 |
| 5,045,578 A | 9/1991 | Claesen et al. ............. | 524/101 |
| 5,073,605 A | 12/1991 | Hallgren et al. ............ | 525/396 |
| 5,089,343 A | 2/1992 | Colborn et al. ............. | 428/416 |
| 5,108,842 A | 4/1992 | Hallgren et al. ............ | 428/416 |
| 5,141,791 A | 8/1992 | Chao et al. .................. | 428/209 |
| 5,162,450 A | 11/1992 | Chao et al. .................. | 525/396 |
| 5,210,119 A | 5/1993 | Claesen et al. .............. | 524/99 |
| 5,213,886 A | 5/1993 | Chao et al. .................. | 523/427 |
| 5,218,030 A | 6/1993 | Katayose et al. ........... | 524/371 |
| 5,262,491 A | 11/1993 | Jain et al. .................... | 525/396 |
| 5,308,565 A | 5/1994 | Weber et al. ................ | 264/112 |
| 5,552,487 A | 9/1996 | Clark et al. .................. | 525/131 |
| 5,834,565 A | 11/1998 | Tracy et al. .................. | 525/391 |
| 5,939,472 A | 8/1999 | Ito et al. ...................... | 523/433 |
| 6,117,952 A | 9/2000 | Finter et al. ................. | 525/438 |
| 6,376,021 B1 * | 4/2002 | Spellane ..................... | 427/388.2 |

FOREIGN PATENT DOCUMENTS

| | | |
|---|---|---|
| GB | 1404247 | 8/1975 |
| JP | 58219217 | 12/1983 |
| JP | 61-7331 A | * 1/1986 |
| JP | 61-007331 | 1/1986 |
| JP | 03-223368 | 10/1991 |
| JP | 4-86254 A | * 3/1992 |
| WO | WO 97/28905 | 8/1997 |

* cited by examiner

*Primary Examiner*—Robert E. L. Sellers
(74) *Attorney, Agent, or Firm*—S. Bruce Brown; Noreen C. Johnson

(57) ABSTRACT

Powder coating compositions comprising at least one thermosetting resin and at least one poly(phenylene ether) are disclosed.

16 Claims, 3 Drawing Sheets

Magnification 600 Times

Magnification 3,300 Times

Magnification 3,300 Times

US 6,576,718 B1

POWDER COATING OF THERMOSETTING RESIN(S) AND POLY(PHENYLENE ETHERS (S))

CROSS REFERENCE TO RELATED APPLICATIONS

Continuity Statement This application claims the benefit of U.S. Provisional Application No. 60/157,683, filed Oct. 5, 1999, which is incorporated herein by reference.

BACKGROUND OF INVENTION

This invention relates to powder coating compositions. More particularly, the invention relates to powder coating compositions comprising at least one thermosetting resin and at least one poly(phenylene ether).

Organic solvent type coatings, which are obtained by dissolving main components such as resin and the like in an organic solvent and adding thereto auxiliary components such as coloring agent, curing agent and the like, have heretofore been used widely in coating applications. However, the problems of these organic solvent type coatings, such as fire hazard, adverse effect on safety and hygiene, environmental pollution and the like, has resulted in increased attention being paid to coatings which vaporize no organic solvent, particularly aqueous emulsion type coatings and powder coatings.

Aqueous emulsion type coatings, however, also have drawbacks. For example in producing such a coating resin particles and a pigment are typically dispersed stably in an aqueous medium and therefore a hydrophilic substance such as emulsifier or the like is used, the film formed with the coating is inevitably inferior in properties such as water resistance, alkali resistance and the like; moreover, the film often has low adhesivity to a material to be coated; further, it takes a time to obtain a dried film, as compared with the case of an organic solvent type coating and, in order to complete film drying in a short time, special equipment and a high cost are required.

In contrast, powder coatings, which contain no organic solvent, have various excellent advantages. For example, they have very low volatile organic content and give off very little volatile material to the environment when cured; they are free from fire hazard, adverse effect on safety and hygiene, environmental pollution, or the like; they can be stored in an ordinary storehouse; the amount of ventilation air in a spray booth can be a minimum and the ventilation air can be recirculated, resulting in high energy efficiency; and the coating film obtained has no foams which are generated by the vaporization of solvent during film drying. Powder coatings have further advantages. For example, they can be used as they are without the necessity of adjusting the viscosity, solid content, etc.; and they can be easily recovered without staining the operation site and producing any waste. Furthermore, powder coatings can be applied by automated coating procedures and, in view of the total cost including cost of materials, pretreatment cost, cost of coating operation, equipment cost, etc., are very economical as compared with organic solvent type coatings and aqueous emulsion type coatings.

Powder coatings generally comprise a solid film-forming resin, often with one or more pigments. They can be thermoplastic-based but are more usually thermoset-based, typically incorporating two co-reactive film-forming resins or incorporating a curing agent for a film-forming resin in the powder particles.

Heretofore, powder coatings which contain primarily an epoxy resin and a curing agent have been employed in the art, and although these generally have good chemical resistance, adhesion, and surface hardness, etc., they often exhibit less than optimal mechanical properties such as inadequate fracture toughness. Therefore, the present inventors, as a result of an intensive investigation aiming at development of a powder coating composition have found a thermoset composition for powder coatings which can provide a coating layer with improved fracture toughness and other properties without loss of chemical resistance, adhesion, and surface hardness, etc. which are characteristics in typical epoxy resin-based powder coatings.

SUMMARY OF INVENTION

One aspect of the invention is a powder coating composition comprising at least one thermosetting resin and at least one poly(phenylene ether).

Another aspect of the invention is a process for making a powder coating composition which comprises combining at least one thermosetting resin and at least one poly(phenylene ether).

Still another aspect of the invention is an article coated with a powder coating composition comprising at least one thermosetting resin and at least one poly(phenylene ether). Yet another aspect of the invention is an article coated with a cured powder coating composition comprising at least one thermosetting resin and at least one poly (phenylene ether).

DETAILED DESCRIPTION

Figure 1:
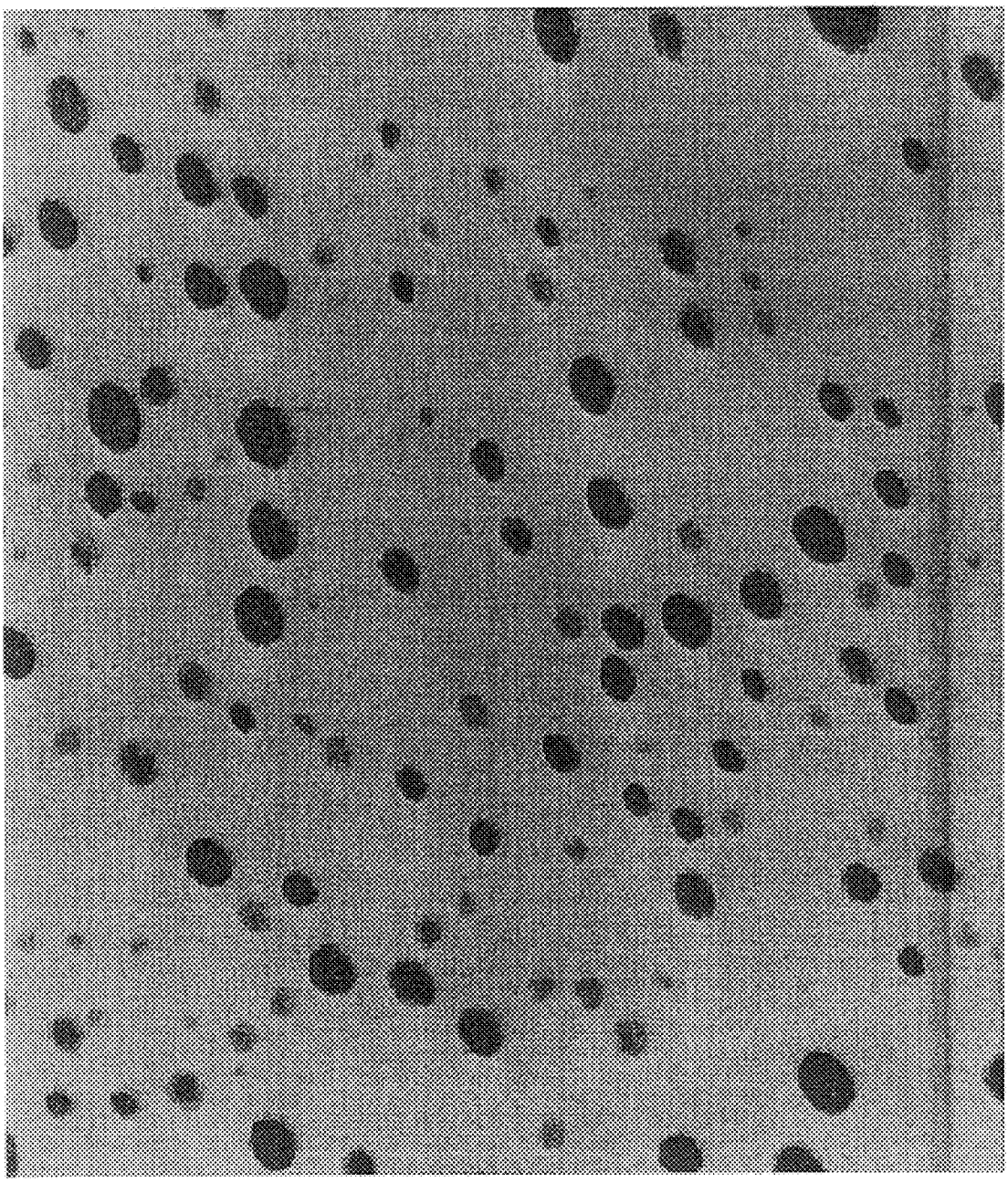
FIG. 1 shows the transmission electron micrograph (TEM) for the PPE/EPON 828 MDEA composition of example 3 containing 0.12 IV (intrinsic viscosity) PPE.

Thermosetting resins useful in the present invention are those commonly used in powder coating applications. Representative examples include thermosetting resins comprising carboxy-functional polyester resins, hydroxy-functional polyester resins, acrylic polymers, fluoropolymers, and epoxy resins.

Useful polyester resins are typically obtained by condensation polymerization reaction between a saturated polybasic acid or its anhydride and a polyalcohol. Non-limiting examples of dibasic acids and acid anhydrides for this purpose include phthalic acid, phthalic anhydride, isophthalic acid, terephthalic acid, hexahydrophthalic anhydride, tetrachlorophthalic anhydride, hexahydrophthalic anhydride, pyromellitic anhydride, succinic acid and adipic acid. Non-limiting examples of useful polyols are ethylene glycol, diethylene glycol, triethylene glycol, propylene glycol, dipropylene glycol, glycerin, trimethylolpropane, pentaerythritol, neopentyl glycol and hydrogenated bisphenol A.

Crosslinking agents for the polyester resins include acid anhydrides, such as pyromellitic anhydride, trimellitic anhydride, phthalic anhydride, and succinic anhydride; aminoplasts such as hexamethoxymethylolmelamine, trimethylolmelamine trimethyl ether, hexamethylolmelamine hexamethyl ether, hexamethylolmelamine and trimethylolbenzoguanamine; glycol urils; and blocked aliphatic and aromatic polyisocyanates, particularly diisocyanates, such as blocked hexamethylene diisocyanate, blocked isophorone diisocyanate, and blocked polymethylene polyphenylisocyanate.

Preferable blocking agents for reaction with polyisocyanates are oximes, such as methylethyl ketoxime, methyl-n-amyl ketoxime, acetone oxime, cyclohexanone oxime and caprolactam. Other blocking agents include malonic esters and any suitable aliphatic, cycloaliphatic, aromatic and alkyl monoalcohols. Additional blocking agents include the lower aliphatic alcohols such as methyl, ethyl, chloroethyl, propyl, butyl, amyl, hexyl, heptyl, octyl, nonyl, 3,3,5-trimethylhexanol, decyl and lauryl alcohols, and the like. Examples of aromatic-alkyl alcohols, include phenylcarbinol, ethylene glycol monoethyl ether, monobutyl ether, monopropyl ether and the like. Other blocking agents are phenolic compounds such as phenol itself and substituted phenols where the substituents do not adversely affect the coating operations including cresol, nitrophenol, chlorophenol and t-butyl phenol. Also suitable are dibutyl amine and tertiary hydroxyl amines such as diethylethanolamine.

Examples of suitable acrylic polymers for purposes of the present invention are well known in the art, and can be prepared by polymerizing copolymerizable monomers with other functional group-containing monomers. Suitable copolymerizable monomers include olefinic unsaturated monomers such as ethylene, propylene and isobutylene, aromatic monomers such as styrene, vinyltoluene and .alpha.-methyl styrene, esters of acrylic acid and methacrylic acid with alcohols having 1 to 18 carbon atoms such as methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, cyclohexyl acrylate, cyclohexyl methacrylate, 2-ethylhexyl acrylate, 2-ethylhexyl methacrylate, lauryl acrylate and lauryl methacrylate, vinyl esters of carboxylic acids having 2 to 11 carbon atoms such as vinyl acetate, vinyl propionate and vinyl 2-ethylhexylacrylate and other co-monomers such as vinyl chloride, acrylonitrile and methacrylonitrile. These co-monomers can be used singly or as a mixture of two or more of them. Suitable functional group containing monomers are described as follows.

For example, hydroxy-functional acrylic polymers may be formed by reaction of the copolymerizable monomer with hydroxyethyl acrylate, hydroxybutyl acrylate, hydroxybutyl methacrylate, hydroxypropyl acrylate and the like. Amino functional acrylic monomers would include t-butylaminoethyl methacrylate and t-butylaminoethylacrylate. Preferred hydroxy functional acrylic resins typically have a molecular weight of between 10,000 and 50,000.

Epoxy functional groups may be incorporated into an acrylic polymer by reaction with monomers having epoxy functional groups such as glycidyl acrylate, glycidyl methacrylate, allyl glycidyl ether. Carboxy functional groups may be incorporated into an acrylic polymer by reaction with acrylic acid, methacrylic acid, itaconic acid, maleic acid, fumaric acid, and monoesters of maleic acid and fumaric acid with monohydric alcohols.

Hydroxy-functional acrylic resins may be crosslinked by the aminoplasts described above as useful for polyesters. Other useful crosslinkers include blocked diisocyanates, formed by reacting a blocking agent with diisocyanates including isophorone diisocyanate, the isocyanurate of hexamethylene diisocyanate, toluene diisocyanate, methylene diphenyl diisocyanate, methylene dicyclohexyl diisocyanate, 2-methyl-1,5-pentane diisocyanate, 2,2,4-trimethyl- 1,6-hexane diisocyanate and 1,1 2-dodecane diisocyanate.

Where the functional radicals of the acrylic resin are carboxyl, the crosslinking agent may be selected from the group consisting of diepoxy compounds, polyoxazolines and polydioxanes.

Where the functional radicals of the acrylic resin are glycidyl, examples of suitable crosslinking agents include polycarboxylic acids and their anhydrides such as phthalic acid, phthalic anhydride, trimellitic anhydride and pyromellitic anhydride; polyphenols such as catechol, resorcinol, hydroquinone, pyrogallol and fluoroglumine; and polyamines such as ethylenediamine, meta-phenylenediamine, 4-4'-diaminodiphenylmethane, 4,4'-diaminodiphenyl sulfone and 4,4'-diaminodiphenyl ether.

Other suitable thermosetting resins include functional fluoropolymers, functional fluorochloropolymers and functional fluoroacrylic polymers, each of which may be hydroxy-functional or carboxy-functional, and may be used as the sole thermosetting resin polymer or in conjunction with one or more functional acrylic, polyester and/or epoxy resins, with appropriate curing agents for the functional polymers.

The preferred thermosetting resin for compositions of the present invention comprise at least one epoxy resin. The at least one epoxy resin employed is not particularly restricted. Epoxy resins, including advanced (or upstaged) epoxy resin systems, which are generally employed for coating material, can be used. Examples of epoxy resins include bisphenol A type epoxy resins, novolac epoxy resins or alicyclic epoxy resins, and epoxy resins advanced through reaction with bisphenols.

In general, the at least one epoxy resin component may comprise virtually any epoxy resin that is liquid, or preferably solid, at room temperature having a mean epoxy functionality of about 2 or greater than 2, that is to say having on average about two or more than two epoxy groups per molecule, such as, for example, corresponding polyglycidyl ethers or polyglycidyl esters. Especially preferred examples of resins suitable for the at least one epoxy resin component include: triglycidyl isocyanurate; trimellitic acid triglycidyl ester; hexahydrotrimellitic acid triglycidyl ester; solid mixed phases comprising a first component selected from trimellitic acid triglycidyl ester, hexahydrotrimellitic acid triglycidyl ester and mixtures of trimellitic acid triglycidyl ester and hexahydrotrimellitic acid triglycidyl ester, and a second component selected from terephthalic acid diglycidyl ester, hexahydroterephthalic acid diglycidyl ester and mixtures of terephthalic acid diglycidyl ester and hexahydroterephthalic acid diglycidyl ester; epoxyphenol novolacs; epoxycresol novolacs and mixtures of two or more of these resins.

Solid mixed phases as mentioned above are based on at least one epoxy resin component that is solid at room temperature and at least one epoxy resin component that is liquid at room temperature. Mixed phases of that kind and the preparation thereof are described, for example, in European Patent Application 536,085.

Preferred epoxy resin components are epoxyphenol novolacs and epoxycresol novolacs, especially the latter since, inter alia, they typically do not cause any appreciable reduction of the Tg value (glass transition temperature) of the epoxy component and hence result in epoxy resin mixtures having an especially high softening temperature, which has a positive effect on the storage stability of the finished powder coating compositions.

The epoxy resin components may, if desired, also comprise small amounts, for example less than approximately 15% by weight of total epoxy resin components, of other, preferably solid, epoxy resins, for example a conventional diglycidyl ether of bisphenol A. The addition of such other epoxy resins is sometimes unavoidable, since a number of resins of that kind are present in commercial additives for powder coating compositions, for example in customary agents for modifying the surface tension of powder coating compositions which, by reducing local differences in surface tension, are able to prevent, for example, crater formation during the full cure of the powder resin coating.

In addition, the powder coating compositions may contain one or more catalysts or curing agents and, if so desired, an extra cross-linking agent. As a curing agent, there may be used conventional ones for an epoxy resin, e.g., a polyamine type curing agent, an acid anhydride type curing agent, a polyphenol type curing agent, an anionic polymerization catalytic curing agent, a cationic polymerization catalytic curing agent, a latent curing agent and the like. Representative examples include, but are not limited to, dicyandiamide and its derivatives; acid anhydrides such as phthalic anhydride, trimellitic anhydride, pyromellitic anhydride, hexahydrophthalic anhydride, maleic anhydride and succinic anhydride; aromatic polyamines, such as ethylenediamine, meta-phenylenediamine, diethyltoluenediamine, methylene bis(2,6-dimethylaniline), tris(dimethylaminomethyl)phenol, 4-4'-diaminodiphenylmethane, 4,4'-diaminodiphenyl sulfone, 4,4'-diaminodiphenyl ether, and 3-phenyl-1,1-dimethyl urea; imidazole, 1-methylimidazole, 1,2-dimethylimidazole, 2-methylimidazole, 2-heptadecylimidazole, 2-ethyl-4-methylimidazole, 2-undecylimidazole, and 1-(2-cyanoethyl)-2-phenylimidazole; and dihydrazide. Commercially available imidazole-arylene polyamine mixtures can be used; such as those mixtures containing arylene polyamines with a high degree of alkyl substitution on the aromatic ring, typically at least three such substituents.

The at least one polyphenylene ether (PPE) component of the instant invention typically comprises at least one of a plurality of structural units represented by at least one of Formulas I, II, III, IV, V, and VI:

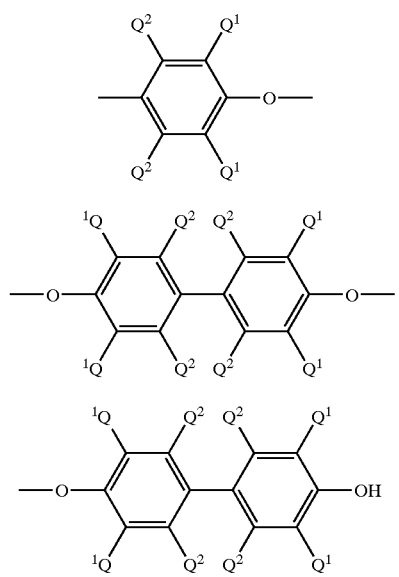

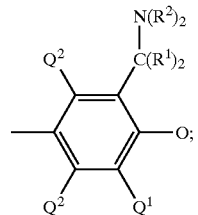

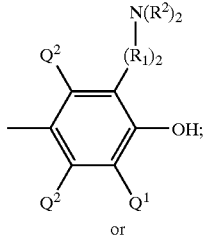

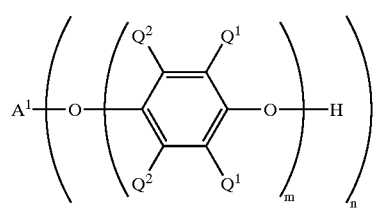

wherein $Q^1$ and $Q^2$ independently represent hydrogen, halogen, alkyl, aryl, mixed alkyl-aryl hydrocarbons, alkoxy, or thioalkyl; $R^1$ at each occurrence independently represents hydrogen, $C_{1-10}$ alkyl, or $C_{6-10}$ aryl; $R^2$ at each occurrence is independently hydrogen, or $C_{1-20}$ alkyl, preferably a $C_1$–$C_{10}$ alkyl, $A^1$ is $C_6$–$C_{10}$ aryl, optionally substituted with $C_6$–$C_{10}$ aryl, $C_1$–$C_{20}$ alkyl, $C_1$–$C_{20}$ alkoxy, thio $C_1$–$C_{20}$ alkyl, $C_6$–$C_{10}$ aryloxy, thio $C_6$–$C_{10}$ aryl, $C_6$–$C_{10}$ aryl sulfonyl, or $C_6$–$C_{20}$ mixed aromatic-aliphatic hydrocarbon; n represents an integer from 1 to 5, and m represents an integer from about 5 to about 100. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer. Such polymers may be produced by polymerization in the manner described in the presence or absence of a chain stopper or bisphenol as described in the prior art.

Also included are PPE containing other substituents grafted onto the polymer. These polymers are described in the patent literature and may be prepared by grafting such other substituents onto the polyphenylene ether in a known manner. Included are PPE grafted with polymeric resins such as polystyrene, polybutadiene, or other vinyl containing polymers.

In a one embodiment, at least some of the PPE is a "functionalized PPE." Functionalized PPE refers to PPE that contain species such as acid, anhydride, amine, imide, epoxy, oxazoline, orthoester, hydroxyl, phosphate, phosphonate, and the like. In the final blend, the functionalized PPE may be referred to as "compatibilized PPE" because of the resultant improved compatibility between the PPE and the other components. Accordingly, appropriate functionalized PPE are those which may affect the compatibility of the PPE with the various components of the blend (e.g., the PPE and the thermosetting resin). Compatibility is meant to include the stabilization of gross phase separation between the components of the blend. Indicators of improved compatibilization include, for example, reduced lamination tendency, increased ductility and improved phase morphology stabilization. It is through the effect of improving the compatibility of the blend components which determines, in part, the desirable physical properties of the blend.

One way to prepare appropriate functionalized PPE is to allow the PPE to react with at least one compound having both (i) a carbon-carbon double bond or a carbon-carbon triple bond and (ii) at least one species of the group consisting of carboxylic acids, acid anhydrides, acid amides, imides, amines, hydroxyls and carboxylic acid ammonium salts. These compounds are sometimes referred to as functionalizers. Illustrative compounds used to accomplish the functionalization of the PPE include maleic anhydride, fumaric acid, maleimides such as N-phenylmaleimide and 1,4-phenylene-bis-methylene-alpha,alpha'-bismaleimide, maleic hydrazide, methylnadic anhydride, fatty oils (e.g., soybean oil, tung oil, linseed oil, sesame oil), unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Examples of such typical reagents for preparing useful functionalized PPE are described in U.S. Pat. Nos. 4,315,086, 4,755,566, and 4,888,397, which are incorporated herein by reference.

Non-polymeric aliphatic polycarboxylic acids are also useful for preparing an appropriate functionalized PPE. Included in this group of species, also known as compatibilizers or functionalizers, are, for example, the aliphatic polycarboxylic acids, and acid esters represented by the formula (VII):

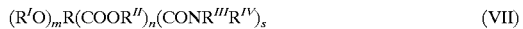

$$(R'O)_m R(COOR'')_n (CONR'''R^{IV})_s \qquad (VII)$$

wherein R is a linear or branched chain, saturated aliphatic hydrocarbon of from 2 to 20, preferably 2 to 10, carbon atoms; R is selected from the group consisting of hydrogen or an alkyl, aryl, acyl, or carbonyl dioxy group of 1 to 10, preferably 1 to 6, most preferably 1 to 4, carbon atoms, with hydrogen being especially preferred; each $R''$ is independently selected from the group consisting of hydrogen or an alkyl or aryl group of from 1 to 20 carbon atoms preferably from 1 to 10 carbon atoms; each $R'''$ and $R^{IV}$ is independently selected from the group consisting essentially of hydrogen or an alkyl or aryl group of from 1 to 10, preferably from 1 to 6, most preferably 1 to 4, carbon atoms; m is equal to I and (n+s) is greater than or equal to 2, preferably equal to 2 or 3, and n and s are each greater than or equal to zero; and wherein (OR') is alpha or beta to a carbonyl group and at least two carbonyl groups are separated by 2 to 6 carbon atoms. Obviously, $R'$, $R''$, $R'''$ and $R^{IV}$ cannot be aryl when the respective substituent has less than 6 carbon atoms.

Illustrative of suitable polycarboxylic acids are citric acid, malic acid, and agaricic acid; including the various commercial forms thereof, such as, for example, the anhydrous and hydrated acids. Illustrative acid esters useful herein include, for example, acetyl citrate and mono- and/or distearyl citrates and the like. Suitable acid amides useful herein include, for example, N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Examples of suitable functionalizing compounds can be found in U.S. Pat. Nos. 4,315,086, 4,755,566, 4,873,286 and 5,000,897, all of which are incorporated herein by reference.

The amount of the above mentioned functionalizing agents that is required to appropriately functionalize the PPE is that which is sufficient to improve the compatibility between the various components in the composition. As previously discussed, indications of improved compatibility include resistance to lamination, improved physical properties, and a stabilized morphology between the blend component phases under static or low shear conditions. It is thought that reactions can occur between some of the components of the composition, for example between the PPE and the thermosetting resin and/or between the functionalized PPE and the thermosetting resin. These reactions are believed to lead to various copolymers between the components of the blend. An effective amount of the above mentioned functionalizing agents, based on the amount of the PPE, is generally up to about 8% by weight, and is preferably from about 0.05% to about 4% by weight. In the most preferred embodiments, the amount of the functionalizing agent is in the range of about 0.1% to about 2.0% by weight based on the amount of the PPE. The actual amount utilized will also depend on the molecular weight of the functionalizing agent, the number and type of reactive species per molecule of functionalizing agent, the type of thermosetting resin employed, the crosslinking agent type and amount present, and the degree of compatibility that is desired in the final composition. One of ordinary skill in the art will be able to determine an appropriate level without undue experimentation.

Another useful method for preparing an appropriate functionalized PPE involves allowing the PPE to react with a compound containing an acyl functional group and one of the aforementioned species or a species capable of being transformed into one of these species. Non-limiting examples include chloroformyl succinic anhydride, chloroethanoyl succinic anhydride, trimellitic anhydride acid chloride, 1-acetoxy-acetyl-3,4-dibenzoic acid anhydride, and terephthalic acid acid chloride. Additional examples and methods to prepare such functionalized PPE can be found in U.S. Pat. Nos. 4,600,741 and 4,642,358, each of which is incorporated herein by reference. The aforementioned methods for preparing a functionalized PPE may be used alone or in combination with one another.

The PPE are typically prepared by the known oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly (2,6-dimethyl-1,4-phenylene ether), and 2,3,6-trimethylphenol (wherein each $Q^1$ and one $Q^2$ are methyl and the other $Q^2$ is hydrogen). In addition, these materials can be copolymerized with a chain stopper such as 2,4,6 trimethylphenol.

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, omega-hydroxyoximes (monomeric and polymeric), o-hydroxyaryl oximes and alpha, alpha-diketones. Also useful are known cobalt-containing catalyst systems. Suitable manganese and cobalt-containing catalyst systems for polyphenylene ether preparation are known in the art by reason of disclosure in numerous patents and publications.

It will be apparent to those skilled in the art from the foregoing that the PPE contemplated for use in the present invention include all those presently known and those under development by, for example, General Electric Company, irrespective of variations in structural units or ancillary chemical features.

For the purposes of the present invention, the PPE composition (including any functionalized PPE) has a number average molecular weight of between about 500 and about 28,000, preferably between about 1,500 and about 22,000, more preferably between about 2,100 and about 21,000, and most preferably between about 2,600 and about 16,000, as determined by Gel Permeation Chromatography (GPC). Low molecular weight PPE of the type employed herein (for example, PPE with molecular weight below about 12,000) are not readily available as commercial products at present. In one procedure, low molecular weight PPE are prepared from PPE typically having a number average molecular weight in the range of about 15,000–25,000. Such preparation of a low molecular PPE composition can be accomplished by reacting the PPE with an oxidizing agent such as a peroxide or a quinone with or without a phenol (including bisphenols). Another procedure is to obtain a low molecular weight PPE by oxidative coupling as described above to produce resins of less than 3,000 number average molecular weight which are isolated, preferably, by a direct isolation method. However, even such low molecular weight resins can optionally be functionalized with a peroxide or peroxide and a phenol to achieve even lower molecular weight.

Phenolics useful in the redistribution reaction described herein include those exemplified by Formula (VIII):

$$A^1X_n \qquad \text{(VIII)}$$

wherein $A^1$ is any aromatic, aliphatic, mixed aliphatic-aromatic hydrocarbons, heterocycles or derivatives of the like, X is a hydroxy residue and n is any integer from 1 to about 200 and, preferably, from 1 to about 5.

As previously stated, the PPE number average molecular weight (Mn) may be reduced by reacting the PPE directly with a peroxide or with a peroxide and a phenol. In general, any peroxide would be useful in the instant invention and would include those described by the following Formula (IX):

$$A^2\text{—O—O—}A^3 \qquad \text{(IX)}$$

wherein $A^2$ and $A^3$ are any aliphatic acyl, aromatic acyl group, alkyl, or mixed aliphatic-aromatic hydrocarbon, hydrogen or inorganic ester moiety or derivatives of the like.

Typical of peroxides useful in this invention include without limitation:

1) Diacyl peroxides such as dibenzoyl peroxide, 4,4'-di-t-butylbenzoyl peroxide or other aryl-substituted derivatives, dilauryl peroxide, acetyl benzoyl peroxide, acetyl cyclohexylsulfonyl peroxide or diphthaloyl peroxide.

2) Peroxydicarbonates such as dicetylperoxydicarbonate.

3) Peroxyacids such as perbenzoic acid, 3-chloroperbenzoic acid, 4-nitroperbenzoic acid, and other substituted derivatives of perbenzoic acid, peroxyacetic, peroxypropanoic acid, peroxybutanoic acid, peroxynonanoic acid, peroxydodecanoic acid, diperoxyglutaric acid, diperoxyadipic acid, diperoxyoctanedioic acid, diperoxynonanedioic acid, diperoxydecanedioic acid, diperoxydodecandioic acid, monoperoxyphthalic acid, as well as the inorganic acids such as peroxysulfuric acid, peroxydisulfuric acid, peroxyphosphoric acid, peroxydiphosphoric acid and their corresponding salts.

4) Peroxycarboxylic esters such as t-butyl performate, t-butyl peracetate, t-butyl peroxyisobutyrate, t-butyl perbenzoate, cumyl perbenzoate, t-butyl peroxynonanoate, t-butyl monoperoxymaleate, t-butyl monoperoxyphthalate, di-t-butyl diperoxyadipates, 2,5-dimethyl-2,5-bis(benzoylperoxy)hexane.

These peroxides may be used alone or in combination with or without the presence of a catalyst to induce decomposition of the peroxide and increase the rate of radical production. Other oxidizing agents known in the art including quinones such as 2,2',6,6'-tetramethyldiphenoquinone (TMDQ) may also be used in the presence or absence of a phenol.

The at least one thermosetting resin is employed in compositions of the present invention in amounts between about 99% and about 30% by weight based of the combined weight of thermosetting resin and polyphenylene ether. The at least one polyphenylene ether is present is amounts between about 1% and about 70% and preferably between about 5% and about 30% by weight based of the combined weight of thermosetting resin and polyphenylene ether.

Any of the conventional additives may be satisfactorily used in these powder coating compositions. Such additives include, but are not limited to, fillers, (particularly silica or alumina); thickeners, plasticizers, flow additives, antiblocking agents, antistatic agents, antioxidants, hindered amine light stabilizers and ultraviolet light absorbers. A powder coating component of a composition of the invention may be free from added coloring agents, but usually contains one or more such agents. (pigments or dyes) and can contain one or more performance additives such as a flow-promoting agent, a plasticizer, a stabilizer, for example a stabilizer against UV degradation, an anti-gassing agent, such as benzoin, a filler, or two or more such additives may be present in the coating composition. Examples of pigments which can be used are inorganic pigments such as zinc oxide, zinc sulfide, lithopone, titanium dioxide, black iron oxide, red iron oxide, yellow iron oxide, chrome pigments, antimony white, red lead, cadmium yellow, barium sulfate, lead sulfate, barium carbonate, white lead, alumina white, and carbon black; and organic pigments such as, for example, azo pigments, polycondensation azo pigments, metal complex azo pigments, benzimidazolone pigments, phthalocyanine pigments (blue, green), thioindigo pigments, anthraquinone pigments, flavanthrone pigments, indanthrene pigments, anthrapyridine pigments, pyranthrone pigments, isoindolinone pigments, perylene pigments, quinacridone pigments, isodibenzanthrone pigments, triphendioxane pigments, perinone pigments, quinacridone pigments, vat dye pigments and lakes of acid, basic and mordant dyestuffs. Dyes can be used instead of or as well as pigments.

A pigment content of less than about 40% and preferably between about 0% and about 30% by weight of the total composition may be used. Usually, when a pigment is present, a pigment content of about 25–30% is used, although in the case of dark colors opacity can be obtained with less than about 10% by weight of pigment. Where appropriate, a filler may be used to assist opacity and minimize costs.

Other additives typically comprise between about 0% and about 30%, preferably 5 to 25%, and more preferably between about 10% and about 20% by weight based on total coating composition weight.

Powder coatings of the present invention may be produced by conventional methods known to those skilled in the art and generally comprise appropriately combining at least one thermosetting resin and at least one poly(phenylene ether), together with any catalyst or curing agent, fluidity-controlling agent, coloring agent, charge control agent, and other additives, Typically, the combined components may be subjected to heating, melting and kneading by the use of an extruder or other mixing device, and subjecting the kneaded product to cooling, grinding and classification.

The powder coating compositions of the present invention may be employed for coating substrates by conventional methods. Such methods conventionally include electrostatic coating processes and fluidized bed coating processes. The substrate can optionally be preheated prior to application of a powder coating composition to promote uniform and thicker powder deposition.

In one preferred embodiment a process for forming a coating on a substrate comprises applying a composition of the invention to a substrate by an electrostatic spray coating process, and heating the applied composition to melt and fuse the particles and cure the coating. The electrostatic spray coating process may be a corona charging or tribo charging process. In the case of a tribo charging process, it is recommended that the powder coating composition should be one that has been formulated especially for such application, for example, by the use of suitable polymers of which the so-called "tribo-safe" grades are an example or by the use of additives which can be introduced prior to extrusion in a manner known per se.

Ideally the particle size distribution required for most commercial electrostatic spray apparatus is between 10 and about 140 microns, with a mean particle size by volume within the range of about 15–75 microns. In the electrostatic spray process the powder coating particles are electrostatically charged and the charged particles are attracted to the substrate which is earthed or oppositely charged. The powder coating which does not adhere to the substrate can be recovered for re-use, so that powder coatings are economical in use of ingredients as well as non-polluting to the environment.

The powder may then be cured on the substrate by the application of heat (the process of stoving), usually for a period of from about 5 to about 30 minutes and usually at a temperature in the range of from about 150 degrees to about 220 degrees C., although temperatures down to 120 degrees C. may be used for some resins, especially epoxy resins.

The coating powder can be applied in a single sweep or in several passes. The thickness of the applied coating is less than or equal to about 200 microns, preferably less than about 100 microns, more preferably less than about 50 microns, and most preferably less than about 30 microns.

Another embodiment of the invention comprises coated substrates or articles coated with the compositions of the invention. Suitable substrates may comprise a metal, a heat-stable plastic material, wood, glass, or a ceramic or textile material. Advantageously, a metal substrate is chemically or mechanically cleaned prior to application of the composition, and is preferably subjected to chemical pretreatment, for example, with iron phosphate, zinc phosphate or chromate. Substrates other than metallic are in general preheated prior to application or are pretreated with a material that will aid electrostatic spray application. Typical substrates include, but are not limited to, metals such as steel or aluminum; automobiles, building material or composites.

The function of coatings is typically protective, but appearance is also important, and the at least one thermosetting resin and other ingredients are selected so as to provide the desired performance and appearance characteristics. Thus, for example, in relation to appearance, as well as differently colored coatings, various different aesthetic finishes, for example reduced gloss and textured finishes, may be provided.

In relation to performance, the coatings generally are durable and exhibit good weatherability, stain or dirt resistance, chemical or solvent resistance and/or corrosion resistance, as well as good mechanical properties, e.g. fracture toughness, hardness, flexibility and/or resistance to mechanical impact. Although the invention is not meant to be limited by theory, it is believed that improvement in certain properties such as fracture toughness is related to the morphology of the cured PPE-thermosetting resin compositions. In particular, cured coatings comprising PPE and epoxy resin typically exhibit either two-phase morphology with discrete PPE dispersed particles or complex co-continuous morphology with irregular PPE domains and large irregular epoxy particles with particles of each phase within the other phase as observed by transmission electron microscopy (TEM). The morphology obtained depends upon the amount of PPE present, the PPE molecular weight (or intrinsic viscosity), and cure conditions. Typically high molecular weight PPE and higher amounts of PPE tend to give co-continuous morphology while low molecular weight PPE and lower amounts of PPE tend to give discrete PPE dispersed particles. Improved fracture toughness, to mention one property, is typically seen to be associated with co-continuous morphology. Improved fracture toughness is also typically associated with higher cure temperatures and longer cure times.

After application and curing of the powder coating composition on the article, at least one topcoat layer may be optionally applied over the coating layer. The topcoat can be, for example, a polyester-based coating cured with an aminoplast resin, an acrylic polymer-based coating cured with an aminoplast resin, a mixed resinous blend of an acrylic polymer and polyester containing coating cured with an aminoplast resin. The topcoat may be solvent-based, water-based or another powder coating. The topcoat layer may be a composite coating comprising a colored or pigmented basecoat over which is deposited a transparent or clear coat.

The invention is illustrated by the following non-limiting examples. Bisphenol-A (BPA)-based diglycidylether, (EPON 828 resin) was obtained from Shell Chemical Company. Methylene bis(2,6-diethylaniline) (LONZACURE MDEA curing agent) was obtained from Lonza Corporation. $^1$H-NMR spectra were collected on a GE QE-300 MHz NMR spectrometer using $CDCl_3$ solvent and a tetramethylsilane (TMS) internal standard. $^{31}$P-NMR spectra were recorded on a GE GN-500 MHz spectrometer with endgroup analysis performed as previously described by K. P. Chan et al. in "Macromolecules", vol. 27, p. 6371 (1994). Using these techniques tail (H—Ar) and head (Ar—OH) endgroup concentrations were determined and absolute molecular weights calculated. Gel Permeation Chromatography (GPC) was performed using a Waters Gel Permeation Chromatograph with a bank of Phenomenex Phenogel $10^5$, $10^4$, and 500 Å columns. A polymer solution (100 microliters; approximately 0.3% by weight) was injected and the polymer eluted from the column using a chloroform solvent containing 0.5% ethanol at a flow rate of 1.5 ml/min. Elution was monitored using a UV detector set at 254 nm. The columns were calibrated using polystyrene standards (2,030 to 860,000 g/mol). Intrinsic viscosity (IV) measurements were performed at 25 degrees C. from chloroform solutions using an Ubbelohde viscometer. Differential scanning calorimetry (DSC) was performed using a TA Instruments DSC2920 instrument calibrated using an indium standard. Samples of 10–20 mg were analyzed from approximately 25–250 degrees C. at a heating rate of 10 degrees C./min. Transmission electron micrographs (TEMs) were obtained on specimens sectioned with a diamond knife on an ultramicrotome. The sections were stained using $RuO_4$ vapor to enhance epoxy-PPE contrast. Micrographs were taken on a Philips CM100 TEM operated at 100 KeV. Dynamic Mechanical Analysis (DMA) was performed using a Rheometrics Dynamic Spectrometer 7700. Samples having approximate dimensions of 3.2×64×13 mm were analyzed from 25 to 230 degrees C., at a heating rate of 2 degrees C./min. Thermal mechanical analysis (TMA) was performed on a TA Instruments TMA2940 instrument. Samples approximately 3×3×3 mm in size were analyzed from 25–280 degrees C. at a heating rate of 5 degrees C./min. $K_{1C}$ measurements were performed in accordance with ASTM E399. Samples approximately 3.2×64×13 mm in size were first notched and then a sharp crack was initiated with a razor blade. Load to failure was determined using an Instron 8500 Plus servo-hydraulic test instrument. Flexural Properties were determined in accordance with ASTM D790. Dielectric Properties were measured using a ASTM D150–95.

Four PPE resins varying in intrinsic viscosity from 0.12 to 0.40 dl/g were evaluated in epoxy resin-containing compositions. As shown in Table 1, the hydroxyl endgroup concentration of the PPE resins decreased with increasing molecular weight and intrinsic viscosity. The lower molecular weight 0.12 and 0.15 IV PPE resins also exhibited broader dispersivities, than the 0.30 and 0.40 IV PPE. The relationship between intrinsic viscosity and Tg showed that the Tg values increase steadily with IV up to 0.25 dl/g (Tg 205 degrees C.) and then remained fairly constant.

TABLE 1

| PPE grade | PPO 857A resin | PPO 857B resin | PPO 630 resin | PPO 640 resin |
|---|---|---|---|---|
| Property: | | | | |
| Intrinsic Viscosity (dl/g) | 0.12 | 0.15 | 0.30 | 0.40 |
| Hydroxy endgroup Concentration (μmol/g) | 464.6 | 366.5 | 208.0 | 120.3 |
| $M_n$ ) g/mol) | 2,197 | 3,114 | 9,219 | 15,399 |
| $M_w$ ) g/mol) | 7,822 | 11,007 | 23,969 | 39,868 |
| $M_w/M_n$ | 3.58 | 3.53 | 2.60 | 2.58 |
| Tg (DSC, ° C.) | 166.0 | 176.3 | 208.0 | 212.0 |

EXAMPLES 1–11

PPE/Epoxy resin blends were formulated by first dissolving PPE into EPON 828 resin at 220–260 degrees C. The solution was then cooled to 180 degrees C. and MDEA was added with vigorous stirring. As the curing agent dissolved the solution cooled to approximately 150 degrees C. The formulated resin was then resin transfer molded using a Radius Engineering FlowWare™ RTM 2100 Injector System. The resins were cured in a 203 millimeter (mm)×203 mm×3.2 mm mold and the resulting part machined into appropriate test specimens. Table 2 shows the compositions; all values are in parts by weight. Table 3 shows properties of PPE/EPON 828/MDEA blends from Table 2.

TABLE 2

| Example | Process Conditions[1] | PPE(wt. %) | | | | EPON 828 (wt. %) | MDEA (wt. %) |
|---|---|---|---|---|---|---|---|
| | | 0.12 IV | 0.15 IV | 0.30 IV | 0.40 IV | | |
| 1 | A | 0 | — | — | — | 70.75 | 29.25 |
| 2 | A | 10 | — | — | — | 63.68 | 26.32 |
| 3 | A | 20 | — | — | — | 56.60 | 23.40 |
| 4 | A | 30 | — | — | — | 49.52 | 20.48 |
| 5 | A | — | 20 | — | — | 56.60 | 23.40 |
| 6 | A | — | 30 | — | — | 49.52 | 20.48 |
| 7 | A | — | — | 20 | — | 56.60 | 23.40 |
| 8 | B | — | — | 20 | — | 56.60 | 23.40 |
| 9 | A | — | — | — | 20 | 56.60 | 23.40 |
| 10 | B | — | — | — | 20 | 56.60 | 23.40 |
| 11 | C | — | — | — | 20 | 56.60 | 23.40 |

[1]Process conditions:
A PPE dissolved in epoxy, resin cured at 150° C. (1 hour), 200° C. (2 hours)
B PPE dissolved in epoxy, resin cured at 230° C. (3 hours)

TABLE 2-continued

| Example | Process Conditions[1] | PPE(wt. %) 0.12 IV | 0.15 IV | 0.30 IV | 0.40 IV | EPON 828 (wt. %) | MDEA (wt. %) |
|---|---|---|---|---|---|---|---|

C PPE dispersed (less than 60 microns particle size) in epoxy, resin cured at 150° C. (1 hour), 200° C. (2 hours).

TABLE 3

| Example | PPE Amount (%) | Tg (Tan δ maxima) | Morph-ology[1] | $K_{ic}$ MPa·m$^{1/2}$ | Flexural Modulus kpsi |
|---|---|---|---|---|---|
| 0.12 IV PPE | | | | | |
| 1 | 0 | 171 | H | 0.63(0.09) | 501.1(10.2) |
| 2 | 10 | 169/200 | D | 0.73(0.03) | 528.6(31.2) |
| 3 | 20 | 169/198.0 | D | 0.74(0.04) | 534.4(33.9) |
| 4 | 30 | 165/195 | D | 0.72(0.04) | 535.6(68.7) |
| 0.15 IV PPE | | | | | |
| 5 | 20 | 171/204 | D | 0.76(0.09) | 535.5(30.3) |
| 6 | 30 | 155/205 | CC1 | 1.02(0.14) | — |
| 0.30 IV PPE | | | | | |
| 7 | 20 | 152/213 | CC1 | 1.56 (0.05) | 431.1(8.0) |
| 8 (cured @ 230) | 20 | 157/223 | CC1 | 1.76 (0.07) | — |
| 0.40 IV PPE | | | | | |
| 9 | 20 | 155/217 | C | 1.10 (0.07) | 545.7(24.2) |
| 10 (cured @ 230C) | 20 | 157/225 | CC1 | 1.81 (0.05) | — |
| 10 | 20(Disp) | 168/218 | CC2 | 1.34 (0.04) | — |

(Standard deviations given in parentheses)
[1]Morphology: H = Homogeneous, D = PPE dispersed phase, C = co-continuous; CC1 = complex concontinuous (irregular PPE domains, large irregular epoxy particles; particles of each phase within the other phase); P1 = PPE continuous; P2 = PPE continuous with PPE particles dispersed in the matrix.

Figure 2:
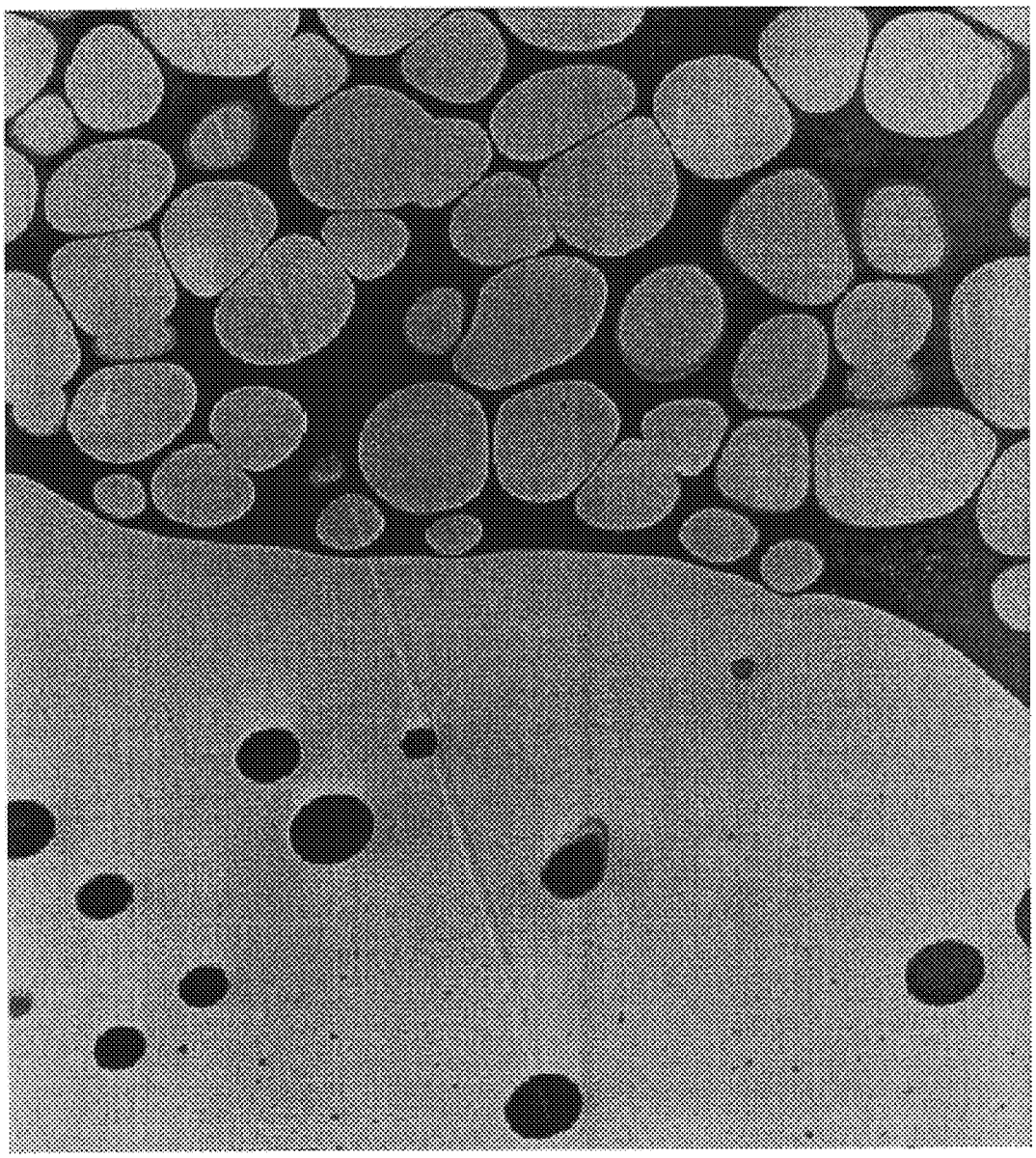
FIG. 2 shows the transmission electron micrograph (TEM) for the PPE/EPON 828/MDEA composition of example 7 containing 0.30 IV PPE.
Figure 3:
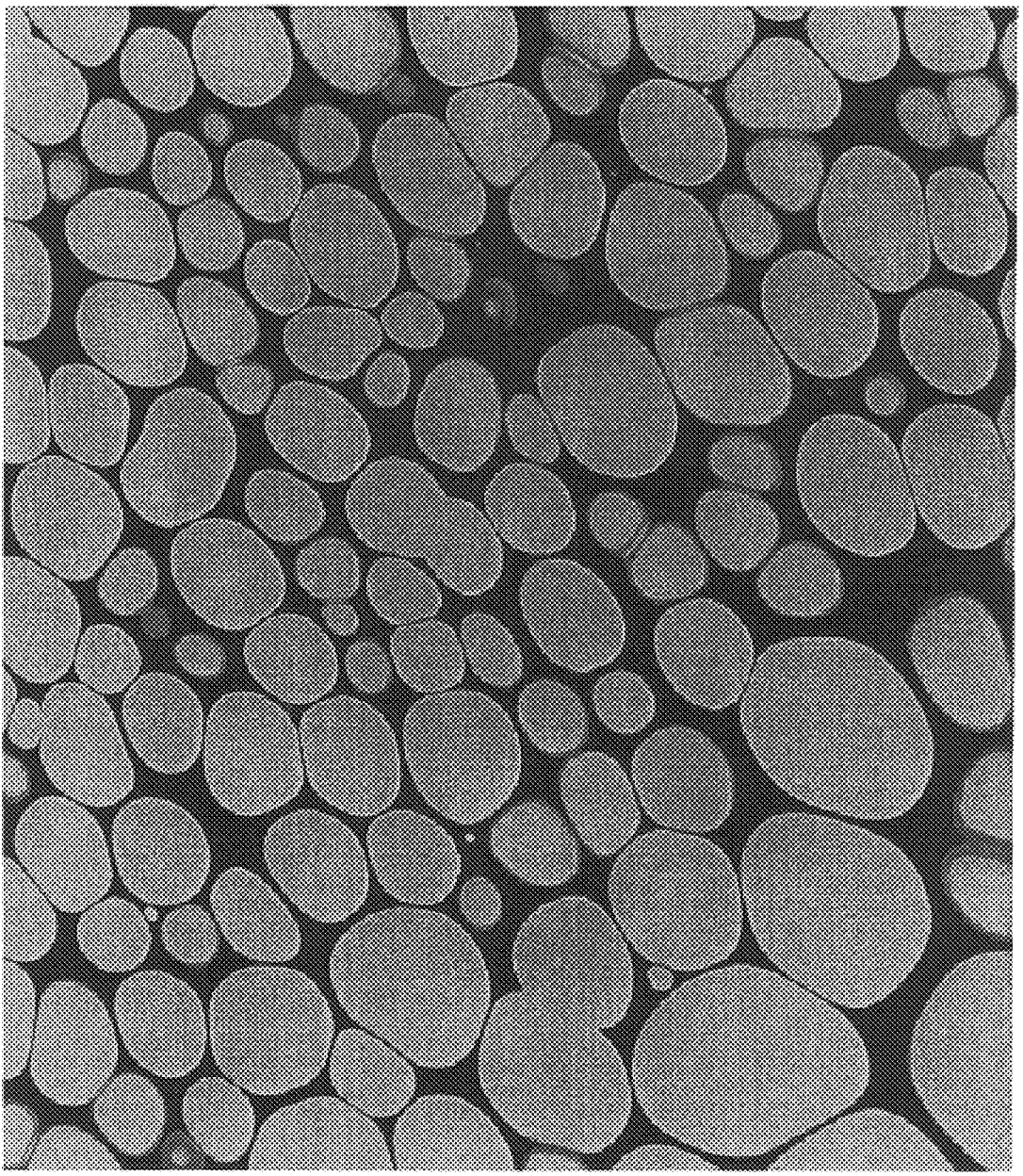
FIG. 3 shows the transmission electron micrograph (TEM) for the PPE/EPON 828/MDEA composition of example 9 containing 0.40 IV PPE.

The morphology of cured PPE/EPON 828/MDEA blends was determined from transmission electron micrographs (TEMs). These micrographs show phase separated morphologies comprising PPE-rich (dark regions) and epoxy-rich domains (light regions). FIG. 1 shows the transmission electron micrograph for the PPE/EPON 828/MDEA composition of example 3 containing 0.12 IV (intrinsic viscosity) PPE. The 0.12 IV PPE containing example produced morphologies in which PPE-rich domains were dispersed in an epoxy-rich matrix. FIG. 2 shows the transmission electron micrograph for the PPE/EPON 828/MDEA composition of example 7 containing 0.30 IV PPE. The 0.30 IV PPE containing example exhibited a complex co-continuous morphology (designated CC1) in which elongated irregular domains of PPE-rich and large epoxy-rich particles were present. Within each of these two phases particles of the other phase were also observed. FIG. 3 shows the transmission electron micrograph for the PPE/EPON 828/MDEA composition of example 9 containing 0.40 IV PPE. This example exhibited a PPE continuous morphology in which epoxy-rich particles were uniformly dispersed within a reticulated PPE phase.

The effect of PPE molecular weight on resin fracture toughness ($K_{1C}$) is shown as follows. For blends cured at 150 degrees C. (1 hour), 200 degrees C. (2 hours) the $K_{1C}$ values increased non-linearly from 0.67 MPa-m$^{1/2}$ in the control to 1.60 MPa-m$^{1/2}$ at 0.30 IV PPE. Unexpectedly, as the intrinsic viscosity of the PPE increased to 0.40 IV the $K_{1C}$ value decreased to 1.10 MPa-m$^{1/2}$. These results were thought to be a reflection of the dominating effects of morphology at the higher molecular weights (0.30–0.40 IV). The effects of morphology were further elucidated by comparing a 0.40 IV PPE containing sample cured at 150 degrees C. (1 hour), 200 degrees C. (2 hours) (example 9) to a 0.40 IV PPE containing sample cured at 230 degrees C. (3 hours) (example 10). The sample cured at lower temperature, which exhibited a PPE continuous morphology yielded a $K_{1C}$ value of 1.10 MPa-m$^{1/2}$, whereas the PPE sample cured at higher temperature produced a complex co-continuous morphology and a $K_{1C}$ value of 1.81 MPa-m$^{1/2}$. The significant enhancements in $K_{1C}$ observed for complex co-continuous morphologies indicates the importance of these morphologies in obtaining high fracture toughness values.

Addition of PPO857A to epoxy thermosets produces blends with significantly improved dielectric properties. The dielectric constants showed nearly linear decreases with increasing PPE content. As expected, the dissipation factor of these blends also decreased with increasing PPE content.

EXAMPLES 12–17

PPE-containing compositions were prepared with mixtures of epoxy resins and curing agent. Both multifunctional and difunctional epoxy resins were employed. The compositions and thermal properties are shown in Table 4. The blends provide melt formable compositions having good thermal properties.

[t5]

TABLE 4

| | | | PPO-Multifunctional Epoxy Resin Blends | | |
|---|---|---|---|---|---|
| Example | Multifunctional Epoxy (MF Epoxy) | Functionality per molecule | Difunctional Epoxy (DF-Epoxy) | PPO/DF-Epoxy/MF-epoxy/MDEA ratio (wt/wt/wt/wt.) | Tg of cured resin (DMA, C) |
| 3 | None | — | Bisphenol-A diglycidyl ether (EPON 828) | 20/56.6/-/23.4 | 168.5, 198.0 |

TABLE 4-continued

PPO-Multifunctional Epoxy Resin Blends

| Example | Multifunctional Epoxy (MF Epoxy) | Functionality per molecule | Difunctional Epoxy (DF-Epoxy) | PPO/DF-Epoxy/ MF-epoxy/MDEA ratio (wt/wt/wt/wt.) | Tg of cured resin (DMA, C) |
|---|---|---|---|---|---|
| 12 | None | — | Tetramethylbiphenol diglycidyl ether (RSS-1407) | 20/55.6/—/24.4 | 157.6, 195.3 |
| 13 | Epoxidized phenol-formaldeyde novolac (EPN1138) | 3.6 | Bisphenol-A diglycidyl ether (EPON 828) | 20.0/28.7/27.4/23.9 | 186.7, 216.2 |
| 14 | Epoxidized cresol-formaldehyde novolac (ECN 1273) | 4.8 | Bisphenol-A diglycidyl ether (EPON 828) | 20.0/26.4/31.8/21.9 | 192.4 |
| 15 | Epoxidized cresol-formaldehyde novolac (ECN 1273) | 4.8 | Tetramethylbiphenol diglycidyl ether (RSS-1407) | | 191.6 |
| 16 | Epoxidized cresol-formaldehyde novolac (ECN 9511) | 2.7 | Bisphenol-A diglycidyl ether (EPON 828) | 20.0/27.6/29.5/22.9 | 172.8, 194.7 |
| 17 | 4,4-methylenedianiline tetraglycidyl ether (MY720) | 4.0 | Bisphenol-A diglycidyl ether (EPON 828) | 20.0/32.0/21.5/26.6 | 167.8, 216.2 |

EXAMPLE 18

A polyphenylene ether resin (IV 0.30 dl/g) is melt-mixed at between about 150 degrees C. and about 200 degrees C. with EPON 828. After the PPE is well-mixed with the epoxy resin, a tetraethylmethylene dianiline curing agent (41 wt. % based on epoxy resin) is added and the composition is quickly cooled to room temperature, and the resulting solid is cryoground to a powder having an average particle size distribution of between about 10 and about 120 microns, with a mean particle size by volume within the range of about 15–75 microns. The resin is coated onto an aluminum substrate by an electrostatic process. The coated article exhibits improved adhesion of coating to substrate, improved cracking resistance under thermal cycling, and less tendency to soften at higher temperatures compared to those properties in an article coated with a composition not containing polyphenylene ether.

EXAMPLE 19

The procedure of example 18 is repeated except that a steel substrate is used in place of aluminum. The coated article exhibits improved adhesion of coating to substrate and improved cracking resistance under thermal cycling, and less tendency to soften at higher temperatures compared to those properties in an article coated with a composition not containing polyphenylene ether.

EXAMPLE 20

The procedure of example 18 is repeated except that EPN 1138 (epoxyphenol novolac available from Ciba) is used in place of EPON 828. The coated article exhibits improved adhesion of coating to substrate and improved cracking resistance under thermal cycling, and less tendency to soften at higher temperatures compared to those properties in an article coated with a composition not containing polyphenylene ether.

EXAMPLE 21

The procedure of example 18 is repeated except that ECN 1173 (epoxycresol novolac available from Ciba) is used in place of EPON 828. The coated article exhibits improved adhesion of coating to substrate and improved cracking resistance under thermal cycling, and less tendency to soften at higher temperatures compared to those properties in an article coated with a composition not containing polyphenylene ether.

EXAMPLE 22

The procedure of example 18 is repeated except that ARALDITE PT 810 (triglycidyl isocyanurate available from Ciba) is used in place of EPON 828. The coated article exhibits improved adhesion of coating to substrate and improved cracking resistance under thermal cycling, and less tendency to soften at higher temperatures compared to those properties in an article coated with a composition not containing polyphenylene ether.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A powder coating composition consisting of a thermosetting resin and at least one poly(phenylene ether).

2. The powder coating composition of claim 1 wherein the thermosetting resin is selected from the group consisting of carboxy-functional polyester resins, hydroxy-functional polyester resins, acrylic polymers, fluoropolymers, and epoxy resins.

3. The powder coating composition of claim 2 in which the thermosetting resin is at least one epoxy resin.

4. The powder coating composition of claim 3 wherein the epoxy resin is selected from the group consisting of triglycidyl isocyanurate, bisphenol-A-based diglycidylethers, epoxidized phenol-formaldehyde novolacs, epoxidized cresol-formaldehyde novolacs, epoxidized alkylphenol-formaldehyde novolacs, epoxidized phenol-dicyclopentadiene novolacs and epoxidized bromophenol-formaldehyde novolacs, and mixtures thereof.

5. The powder coating composition of claim 3 wherein the epoxy is a blend of a difunctional and a multifunctional epoxy resin.

6. The powder coating composition of claim 3 in which the poly(phenylene ether) is a poly(2,6-dimethyl-1,4-phenylene ether).

7. The powder coating composition of claim 6 in which the poly(phenylene ether) has an intrinsic viscosity of about 0.08 deciliters per gram to about 0.56 deciliters per gram as measured in chloroform at 25 degrees C.

8. The powder coating composition of claim 7 in which the poly(phenylene ether) has an intrinsic viscosity of about 0.12 deciliters per gram to about 0.30 deciliters per gram as measured in chloroform at 25 degrees C.

9. The powder coating composition of claim 7 in which the composition is cured at a temperature above the Tg of the poly(phenylene ether).

10. The powder coating composition of claim 7 in which the cured composition exhibits a complex co-continuous morphology.

11. The powder coating composition of claim 10 wherein the cured composition exhibits morphology comprising cured thermoset particles having an average diameter of 100 to 1000 microns and continuous poly(phenylene ether) domains containing cured thermoset particles having an average diameter of less than 20 microns.

12. The powder coating composition of claim 10 wherein the cured thermoset particles having an average diameter of 100 to 1000 microns contain poly(phenylene ether) domains with average diameter of less than 20 microns.

13. An article coated with the powder coating composition of claim 1.

14. An article coated with the cured powder coating composition of claim 1.

15. An article coated with the powder coating composition of claim 6.

16. An article coated with the cured powder coating composition of claim 6.

* * * * *